Dec. 10, 1968    JAMES E. WEBB    3,415,992
ADMINISTRATOR OF THE NATIONAL AERONAUTICS
AND SPACE ADMINISTRATION
EXTENDED AREA SEMICONDUCTOR RADIATION DETECTORS AND A
NOVEL READOUT ARRANGEMENT
Filed Dec. 28, 1965

INVENTOR
Karl Reinitz

BY
ATTORNEYS 3,415,992
EXTENDED AREA SEMICONDUCTOR RADIA-
TION DETECTORS AND A NOVEL READOUT
ARRANGEMENT
James E. Webb, Administrator of the National Aero-
nautics and Space Administration with respect to an in-
vention of Karl Reinitz, 75 Sheridan Road, Arnold,
Md. 21012
Filed Dec. 28, 1965, Ser. No. 517,158
4 Claims. (Cl. 250—83)

ABSTRACT OF THE DISCLOSURE

A mosaic particle sensor having increased sensitivity including means for obtaining higher accuracy position readout with improved ruggedness and reliability. The sensor is comprised of a composite surface barrier diode having a matrix on its insensitive side formed by over-lapping elongated contacts. Thus, if a signal is detected on a particular row or column of the matrix, the position of the particle can be conveniently determined to a degree of accuracy depending on the line density of the contacts.

---

Figure 1:
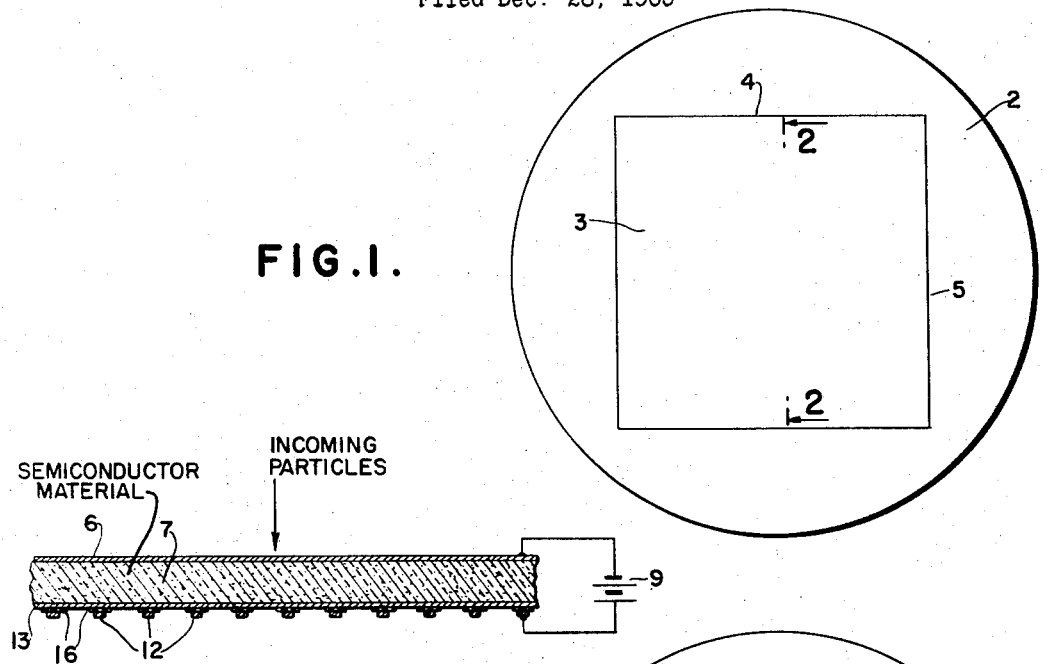

The invention described herein was made in the performance of work under a NASA contract and is subject to the provisions of section 305 of the National Aeronautics and Space Act of 1958, Public Law 85–568 (72 Stat. 435; 42 U.S.C. 4257).

This invention relates generally to mosaic particle detectors and more particularly to a mosaic particle sensor capable of detecting the position of low energy particles.

Prior to the recent advances in the field of semiconductor microelectronics, particle detection was accomplished by means of a conducting element having a readout electrode on each of the ends of the element. The position of the incoming particle was determined by measuring the time it took for the electrons to travel from the point where the particle impinged on the conducting element to the respective electrode. In such a device, the position accuracy is given by $$\frac{X}{X+Y}E$$

where X and Y are the relative distances between the point of contact and the respective electrode and E is the energy of the incoming charged particle. When attempting to determine the position of incoming electrons of low energy, say 50 kev. or less, the inaccuracy in E becomes quite substantial and introduces an intolerable position inaccuracy.

In recent years, mosaic semiconductor particle detectors have, to a great extent, replaced the abovementioned detectors because of the fact that these mosaic semiconductor detectors are more compact, more rugged, operate with increased speed and sensitivity and are able to function equally as well at lower operating voltages. These semiconductor detectors, composed of a plurality of individual diffused semiconductor wafers connected together in a mosaic type of array, are normally placed in the focal plane of the incoming radiation. When the incoming particle penetrates into one of the semiconductor mosaic elements, it creates an electron hole charge cloud within the depleted region of that element. With the aid of an accelerating potential, these charges are collected to obtain an electrical signal indicating the detection of a pulse on that element; this signal being transmitted to contact points on the outside of the unit by means of conducting paths on the perimeter of the individual elements.

There are a number of inherent disadvantages in this type of mosaic semiconductor detector. First of all, the incoming particles must be energetic enough to penetrate through the heavily diffused top layer into the depletion region. This means that low energy electrons, i.e., 50 kev. or less, would not be detected by such a system. Secondly, when dealing with a moderate number of mosaic elements on a single substrate the yield is extremely low, putting severe demands on the read-out techniques. The fact that each mosaic element is connected by means of a conducting path to each of the four adjoining elements means that any fault in a single one of the elements will cause a widespread failure. The fact that each element must be positioned a finite distance from each other causes not only a low yield condition but also means that there must be open or inactive areas on the detector substrate which greatly reduces the efficiency of the device.

Furthermore, because of the fact that many individual mosaic elements are needed to make up the array, there is naturally a problem as to the uniformity of the individual elements. For precise position sensing it is important that each matrix element have the same junction area and junction properties as all of the other matrix elements which, of course, is not always the case in the prior art particle detectors.

The present invention, which is termed a mosaic sensor because of the multiple read-out channels which indicate position within a small fractional area, overcomes these aforementioned disadvantages by having a detector with an activated continuous front surface acting as a single surface barrier diode. This surface barrier diode is made by forming a thin P-type inversion layer on the sensitive side of a high resistivity N-type silicon slice, or wafer. The back, or insensitive, side of the silicon slice is provided with two sets of over-lapping elongated mutually perpendicular contacts, the set of contacts being insulated from the other. Each one of the elongated contacts being part of the diode formed by the P-type inversion layer on the N-type semiconductor. Backbiasing this structure results in the collection of those minority carriers which are produced by the incoming electrons. Since 20 to 50 kev. electrons penetrate into the semiconductor a very small distance, the use of a surface barrier diode rather than a diffused type of semiconductor junction allows for the detection of such low energy electrons. Due to the novel arrangement, the percentage yield of detected energy as compared with incident energy is much higher than that of previously known semiconductor particle detectors.

The contacts on the insensitive side of the wafer can be designed in any manner depending on the application of the position sensor; the two embodiments illustrated herein are those having the contact lines located parallel to the rectangular and polar coordinate axis. Thus, if an electron is detected on a particular row or column, the position of the electron can be determined to a degree of accuracy depending on both the configuration of the contact lines and the line density. Furthermore, by having a continuous front activated surface without any open areas, a high degree of efficiency is attained. Another advantage of using only a single slice of semiconductor material resides in the fact that a very high degree of uniformity is inherently achieved.

As will be explained more fully hereinafter, additional position accuracy can be attained by utilizing a pulse height analyzer for each row and column output, as it is apparent that the relative pulse heights obtained from each one of the four surrounding diode lines would be approximately inversely proportional to the distance of the impact point from the respective diode line. Another method to obtain greater position accuracy, also to be more fully discussed later, is to measure the relative time intervals that it takes for the drifting charge carriers to arrive at two parallel contact lines.

An object of the present invention is to provide a mosaic sensor that can detect the position of low energy particles.

Another object of the invention is to provide a mosaic sensor that can be produced without extremely sensitive fabrication methods.

Another object of the invention is to provide a highly accurate mosaic position sensor having a simplified readout arrangement.

Figure 2:
Figure 3:
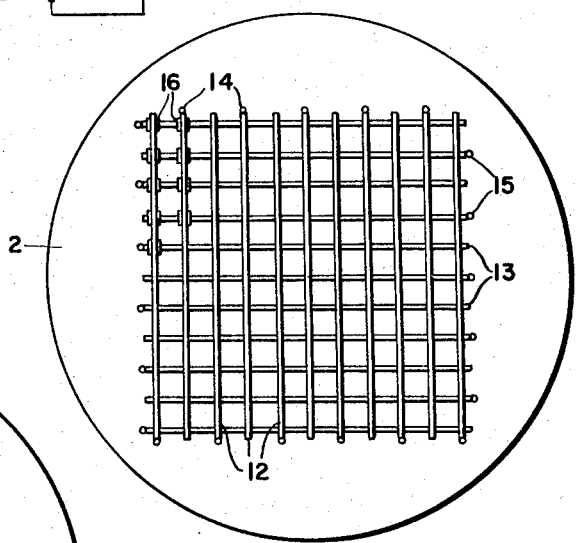
Figure 4:
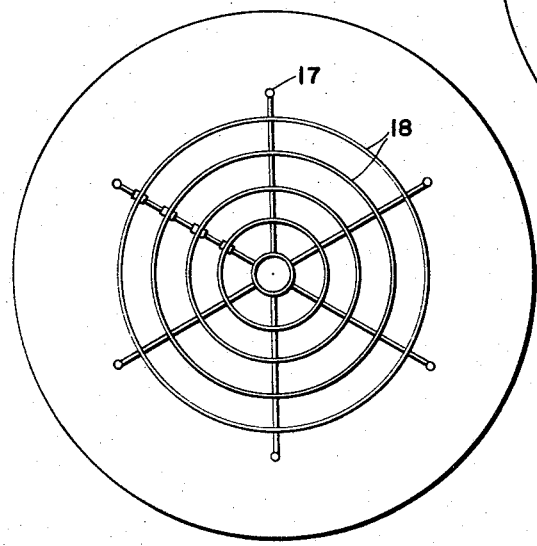

Other objects and attendant advantages of the present invention will be more readily apparent as the same becomes better understood by reference to the following detailed description when considered in conjunction with the accompanying drawing wherein:

FIGURE 1 is a view of the front surface of the mosaic sensor of the instant invention; and FIGURE 2 is a slightly enlarged diagrammatical sectional view of the mosaic sensor taken along the lines 2—2 of FIGURE 1; and FIGURE 3 is a view of the back surface of the mosaic sensor; and FIGURE 4 is a view of an alternate embodiment of the instant invention showing the back surface of the mosaic sensor.

In FIGURE 1, there is shown the front surface of the mosaic sensor, the square area 3 indicating the activated portion of the sensor. The activated portion 3 is fabricated out of a thin slice 2 of high resistivity N-type silicon by first lapping and polishing a surface of the slice to a mirror finish. The wafer is then treated so that the surface of the N-type silicon becomes a P-type inversion layer; this step is generally done by boiling the silicon wafer in water and by etching. The thin layer of gold 6, which is actually applied in the final stages of fabrication, is evaporated on the activated square area bounded by sides 4 and 5 on the front surface. This thin layer of gold serves to establish contact between the lead from the potential source 9 and the P-type surface.

FIGURE 2 shows, by means of a diagrammatic sectional view, the thin gold layer 6 on top of the P-type semiconductor material 7. The backbiasing potential source 9 is diagrammatically shown connected to the gold layer and to a single point on the back surface of the sensor, but in actuality the potential is applied across the whole surface of the sensor.

The read-out arrangement in the instant invention comprises two sets of perpendicular contacts which are photoetched on the back surface of the sensor. FIGURE 3 shows these sets of contacts 12 and 13 arranged parallel to the X–Y axes of a Cartesian coordinate system while FIGURE 4 shows the contacts 17 and 18 located along the axes of a polar coordinate system. As mentioned previously, the particular configuration of the contact lines is solely dependent on the application of the sensor. As shown in FIGURE 3, there are ten metallized contact lines 13 crossing a perpendicular set of contacts 12 with an insulator 16 between them at each crossing site. Insulators 16 are shown just in one corner of FIGURE 3 and on one radial line in FIGURE 4, but it should be noted that the remainder of the insulators were omitted for clarity's sake only and that the insulators are needed at every crossing site.

The fabrication process is carried out by means of a series of evaporation procedures. After the initial lapping and polishing, a first evaporation on the back surface is done through a metal mask leaving contacts 13 and unconnected portions of contacts 12; the lines 12 being broken at the crossing points. During the second evaporation, silicon monoxide insulators 16 are applied over contacts 13 at the crossing points. The third evaporation, which is again done through a metal mask, joins the unconnected portions of contacts 12 so that the gold lines are connected over the insulation pads. Finally, the thin gold layer 6 is evaporated on the front activated surface. This final step is the only one requiring precision evaporation since a scratch on the back surface will not materially alter the performance of the detector.

Each contact lines is evaporated so as to form two layers. The bottom layer is composed of nickel which provides ohmic contact as well as adherence to the silicon, while the top layer is made of gold to allow for the connection of contacts to the lines 12 and 13.

The operation of the sensor will now be described. When an energized particle hits the evaporated gold layer 3, the particle penetrates through the gold layer to the barrier junction close to the surface, this in turn creating a charge cloud a short distance under the junction. Backbiasing this structure by means of potential source 9 results in the collection of those minority carriers which are generated under the junction. Each one of the contacts 12 and 13 form terminals of a diode, with the other terminal of each diode being the gold film on the P-type inversion layer on the sensitive side of the unit. Thus, if a signal is detected on a particular row or column, the position of the particle can be determined to a degree of accuracy depending on the line density. The embodiment shown in FIGURES 2 and 3 has 10 by 10 contact lines, for ease of portrayal but it should be understood that mosaic sensors embodying the novel features of the instant invention having 64 x 64 contact lines have been developed and tested successfully.

When a particle is incident upon the sensor at a point equidistant from two parallel rows or columns, a signal will be detected equally at two of the contacts 14. This read-out will, of course, indicate that the particle is actually equidistant from those two rows or columns. It has been determined that if the particle is incident at a point just slightly closer to one of the parallel lines, then almost the entire signal will be detected by that line. This is due to the fact that the applied potential is in the direction perpendicular to the surfaces of the sensor so that there is very little drift in the direction parallel to the surfaces of the sensor.

The amount and degree of the limited drift mentioned above can be used as a helpful tool in increasing the position accuracy of the sensor. As the charges generated by the impinging particles separate, a certain fraction of them will recombine, decreasing the size of the cloud as it moves along between the contact lines. If the energy of the impinging particle is known and is constant, the size of the pulse obtained from the neighboring contacts will depend on the distance the electrons have traveled before being collected. The relative pulse heights obtained from each of the four surrounding contact lines will bear a relationship determined by the distance of the impact point from the respective contact line.

The pulse height analyzing can be accomplished by connecting a preamplifier and amplifier system to the mosaic sensor contacts 14 and then feeding the output signal from the amplifier to a pulse height analyzer. These instruments are well known in the art, and, for example, an Ortec 101–201 preamplifier and amplifier system and an Atomic Instrument Company Model 510 Single Channel Pulse Height Analyzer could be successfully utilized in this embodiment.

As a practical example of the aforedescribed mosaic sensor, a 32 by 32 contact line unit was fabricated on a silicon wafer that had a ½ inch by ½ inch activated area on the front surface. The thickness of the completed silicon slice was approximately .010", which was the minimum thickness that could be designed while still retaining tolerable physical durability characteristics. The contact lines are spaced .0156" apart with the line thickness being .0025". The average resistance ratio between lines and along lines is approximately 1/200 or less with a resistance of about 50 ohms along a single line. The biasing voltage 9 was approximately 50 volts.

It is apparent that the instant invention provides a novel mosaic sensor possessing many unique advantages. The position sensor is extraordinarily sensitive with an energy range as low as 20 kev. High efficiency is achieved by having a large active-to-inactive area ratio and a high degree of uniformity is maintained by employing established fabrication processes on a single slice of silcon. In addition, a very short response time is achieved by employing a thin slice of semiconductor material having favorable recombination properties. The applied voltage and power requirements are kept to a minimum making the sensor extremely valuable in environments, such as space, where power limitations are critical.

It should be understood that the size and density of the contact lines are only by way of example, and other sensors with higher line densities can be developed in accordance with accepted fabrication procedures. In addition, other lighter metals that adhere to silicon, such as chromium, could be substituted for gold on the sensitive side of the sensor.

Further position accuracy could be obtained by not only measuring the pulse height at each of the surrounding contact lines but also the relative time interval it takes for the charge carriers to arrive at two neighboring parallel lines. Since the charge carriers travel at the same speed throughout the sensor, measurement of the relative time intervals by standard time interval counters would, in effect, indicate at what point in between the two contact lines the particle struck the sensor.

Obviously, numerous modifications and variations are possible in the light of the above teachings. It is therefore understood that within the scope of the appended claims, the invention may be practiced otherwise than described herein.

I claim:

1. A mosaic particle sensor for detecting the position of impinging particles comprising:
   (a) a thin wafer of semiconductive material having a front and rear surface, said front surface having a broad activated area;
   (b) a thin film of metal being affixedly in contact with said front surface across the entire said broad activated area;
   (c) a first and second set of elongated contacts being affixedly in contact along a substantial portion of their length with the rear of said thin wafer, each of said first sets of contacts being arranged in an overlapping configuration in relation to said second set of contacts thereby forming overlapping points;
   (d) an insulation film disposed between said sets of overlapping contacts, said elongated contacts being electrically insulated from each other at said overlapping points by said insulation film;
   (e) a plurality of terminals posts for receiving a source of potential, one of said terminals being connected to said thin film of metal and each elongated contact being provided with and connected to a separate one of said plurality of terminal posts.

2. A mosaic particle sensor as defined in claim 1 wherein said wafer is composed of a P-type inversion layer on said front surface, the remaining part of said wafer being high resistivity N-type material.

3. A mosaic particle sensor as defined in claim 1 wherein each of said elongated contacts is composed of first and second layers, said first layer being in contact with said semiconductor material and being comprised of nickel, and said second layer being in contact with said first layer and being comprised of gold.

4. A mosaic particle sensor as defined in claim 1 wherein, said insulation film is composed of silicon monoxide.

References Cited

UNITED STATES PATENTS 3,207,902   9/1965   Sandborg  ---------- 250—83.3

ARCHIE R. BORCHELT, *Primary Examiner.*

U.S. Cl. X.R.

250—83.3